United States Patent [19]

Kremer

[11] Patent Number: 5,485,379
[45] Date of Patent: Jan. 16, 1996

[54] METHOD AND SYSTEM FOR DETECTING THE PROPER FUNCTIONING OF AN ABS CONTROL UNIT UTILIZING SUBSTANTIALLY IDENTICAL PROGRAMMED MICROPROCESSORS

[75] Inventor: Maria T. Kremer, Canton, Mich.

[73] Assignee: Kelsey Hayes Company, Romulus, Mich.

[21] Appl. No.: 280,184

[22] Filed: Jul. 25, 1994

[51] Int. Cl.⁶ .............................. B60T 8/88; G06F 15/16
[52] U.S. Cl. .............................. 364/426.02; 364/426.04
[58] Field of Search .................... 364/426.03, 426.01, 364/426.02, 424.03, 551.01, 565, 569, 571.05, 184; 303/92, 93, 94, 109; 371/11.3, 14, 16.1, 19

[56] References Cited

U.S. PATENT DOCUMENTS

| | | | |
|---|---|---|---|
| 4,251,873 | 2/1981 | Joby | 364/184 |
| 4,400,792 | 8/1983 | Strelow | 364/925 |
| 4,493,210 | 1/1985 | Fries et al. | 303/92 |
| 4,745,542 | 5/1988 | Baba et al. | 364/184 |
| 4,777,611 | 10/1988 | Tashiro et al. | 364/565 |
| 5,001,641 | 3/1991 | Makino | 364/426.02 |
| 5,193,886 | 3/1993 | Gloceri | 303/92 |

*Primary Examiner*—Kevin J. Teska
*Assistant Examiner*—Tan Q. Nguyen
*Attorney, Agent, or Firm*—Brooks & Kushman

[57] ABSTRACT

A method and apparatus for detecting the proper functioning of an ABS control unit which utilizes substantially identical programmed microprocessors which calculate mismatched wheel speed and extended control loop time. When computed wheel velocities are above 10 mph, each of the microprocessors determines whether the difference in computed wheel velocity between the two microprocessors is at least 2 mph. If the difference is more than 2 mph for more than 6 consecutive program loops, a mismatched wheel speed calculation error is identified. With respect to the second diagnostic control algorithm, each of the microprocessors determines whether the loop time in either microprocessor is extended by ½ milliseconds or more and, if this condition exists for 4 consecutive program loops, the proper diagnostic response is to set an ignition latch code which triggers an inhibit signal.

16 Claims, 5 Drawing Sheets

METHOD AND SYSTEM FOR DETECTING THE PROPER FUNCTIONING OF AN ABS CONTROL UNIT UTILIZING SUBSTANTIALLY IDENTICAL PROGRAMMED MICROPROCESSORS

CROSS-REFERENCE TO RELATED APPLICATION

This application relates to the U.S. patent application Ser. No. 276,344, filed Jul. 18, 1994 and entitled "Method and System for Detecting the Proper Functioning of an ABS Control Unit Utilizing Dual Programmed Microprocessors", filed on the same day as this application and assigned to the same assignee as the present application.

TECHNICAL FIELD

The invention relates to methods and systems for detecting the proper functioning of ABS control units and, in particular, to methods and systems for detecting the proper functioning of ABS control units utilizing substantially identical programmed microprocessors.

BACKGROUND ART

In anti-lock brake systems, it is important to be able to detect if the control unit is properly functioning. A malfunction in the control unit, such as by degradation of a central processing unit (CPU) or clock within a microprocessor, can cause erroneous brake control signals and, hence, improper activation or deactivation of the brakes. Another possible malfunction is the degradation of the signals from a signal converter in the control unit.

To avoid this problem, many anti-lock brake systems now have control units which utilize two separate microprocessors. These two processor designs allow redundant processing of control signals along with the facility to check the accuracy of calculated results. If the two processors disagree as to the value of calculated variables or the state of proper control signals, the control unit can take appropriate steps to disable the system to avoid erroneous operation.

For example, the Bleckmann U.S. Pat. No. 4,113,321, discloses an anti-skid electronic control system having an error detecting circuit. A secondary circuit identical to the primary arithmetic circuits is provided for the anti-skid electronic control system. The outputs of the secondary and primary circuits are connected in a predetermined manner to a comparator arrangement. If an error occurs in the secondary and/or primary circuits, the comparator will detect the error and render the entire anti-skid system inoperable.

The Bleckmann U.S. Pat. No. 4,546,437, discloses a method and circuit for controlling a brake slip control apparatus valve control signals are produced in at least two independently acting, synchronously driven logical circuit units, which may be integrated circuit configurations, complete "microcontrollers" or single-chip microcomputers, and the signals' waveforms of each of the two circuit units are compared and checked for agreement externally and internally at corresponding locations within the two circuit units. Upon the occurrence of variations in the external and/or the internal signals or the signals' waveform, there will be caused, initiated or prepared a complete or partial disconnection of the brake slip control.

The Fennel U.S. Pat. No. 4,773,072, discloses a method and a circuit configuration for suppressing short term interferences in the processing of data by means of two circuit systems. The circuit systems redundantly process the data and, for the purpose of detecting errors and interferences, between the circuit systems data is exchanged and compared for agreement. If comparators detect differences, the transferred data will be taken over and the data processing will be continued with the transferred data. This takes place in several consecutive cycles. As soon as the predetermined scope or a predetermined number of cycles with differences between the compared data is exceeded, an error will be evaluated and indicated.

The Kramer U.S. Pat. No. 5,074,626, discloses an anti-lock brake controller for use in a vehicle anti-lock brake system. The controller includes a main microprocessor and a fail-safe microprocessor of a different type from the main microprocessor, and a device interconnecting the main and fail-safe microprocessors and the remainder of the vehicle braking system so that the fail-safe microprocessor can disable the brake release system independently of the main microprocessor.

The Gloceri U.S. Pat. No. 5,193,886, discloses a wheel speed verification system including an anti-skid control circuit and a method of processor computation confirmation within such an anti-skid control circuit. The confirmation of proper processor operation is done only at a certain one of the computation values. Rotation of a vehicle wheel provides a pulse train, the repetition rate of which is indicative of the vehicle speed. A sequence of program steps is repetitively executed in a microprocessor over a fixed time interval with the microprocessor repeating that same predetermined sequence of program steps during each successive said fixed time interval. A second pulse train is provided having one pulse for each repetition of the sequence of program steps. The speed of at least one vehicle wheel is repetitively computed according to the repetition rate of the first pulse train and the repetition rates of the first and second pulse trains are compared, and corrective action is initiated in the event that the compared repetition rates differ by more than a prescribed amount. The comparison is effected only at a certain specific wheel speed. Alternatively, a computed wheel speed may be compared to the fixed time interval and the anti-skid circuit allowed to continue in operating only so long as the compared wheel speed and time interval are within predetermined limits of one another. Again, the step of comparing is effected only at a certain specific wheel speed.

The Bleckmann U.S. Pat. No. 5,193,887, discloses two microcontrollers interconnected by data exchange lines for use in an anti-lock brake system. Signals are concurrently processed by the microcontrollers independently of one another and exchanged signals are checked for consistency. A deviation of the exchanged signals which is due to malfunctions is signalized to a safety circuit which, thereupon, interrupts the power supply to the solenoid valves. A monitoring signal fed to the safety circuit is a predetermined alternating signal in case of consistency of the exchanged signals and in case of proper operation of the circuit configuration. The safety circuit compares the alternating signal with a time standard derived from a clock generator which is independent of the operating cycle of the microcontrollers. A change in the alternating signals, as well as a failure in the time standard, causes a cut-off of power supply and, hence, of anti-lock control.

One of the problems with the prior art is that generally, the prior art is unable to properly handle transient signals which falsely indicate that there is a problem internal to the ABS control unit. Such transient signals may cause the anti-lock brake system to issue an erroneous brake control signal.

SUMMARY OF THE INVENTION

An object of the present invention is to provide a method and system for detecting the proper functioning of a ABS control unit by ignoring transient signals not permitting them to improperly cause the ABS control unit to issue an erroneous brake control signal.

In carrying out the above object and other objects of the present invention, in a vehicle anti-lock brake system (ABS), a method is provided for detecting the proper functioning of an ABS control unit having first and second microprocessors. The first microprocessor is programmed with a first program to operate on first program loop and the second microprocessor is programmed with a second program to operate on a second program loop. The method includes the steps of: a) generating wheel speed signals based on angular speed of each wheel of the vehicle; b) processing the wheel speed signals to obtain a digital representation for each of the wheel speed signals; and c) utilizing the first programmed microprocessor to calculate a first wheel speed during the first program loop based on the digital representation for a particular wheel. The method also includes the steps of: d) utilizing the second programmed microprocessor to calculate a second wheel speed during the second program loop also based on the digital representation for the particular wheel; e) utilizing each of the first and second programmed microprocessors to subtract the first and second wheels speeds to obtain first and second difference values, respectively, and to compare its respective difference value with a first predetermined value; and f) repeating steps a)-e) as long as the first and second difference values are greater than the first predetermined value in a first predetermined number of consecutive program loops of both of the first and second programmed microprocessors. Finally, the method includes the step of g) utilizing the first and second programmed microprocessors to generate first and second output inhibit signals, respectively, upon repeating steps a)-e) in the first predetermined number of consecutive program loops.

Preferably, the first and second microprocessors have the same number of bits and the first and second program loops are of equal duration.

Also, preferably, the method includes the steps of h) comparing timing of the first program loop with a first reference time to obtain a first delay value comparing the first delay value with a first predetermined time value; i) repeating step h) in a second predetermined number of consecutive program loops as long as the first delay value is greater than the first predetermined time value; and j) generating a third output inhibit signal on repeating step h) the second predetermined number of consecutive program loops.

The above objects and other objects, features, and advantages of the present invention are readily apparent from the following detailed description of the best mode for carrying out the invention when taken in connection with the accompanying drawings.

BRIEF DESCRIPTION OF THE DRAWING FIGURES

BEST MODE FOR CARRYING OUT THE INVENTION

Figure 1:
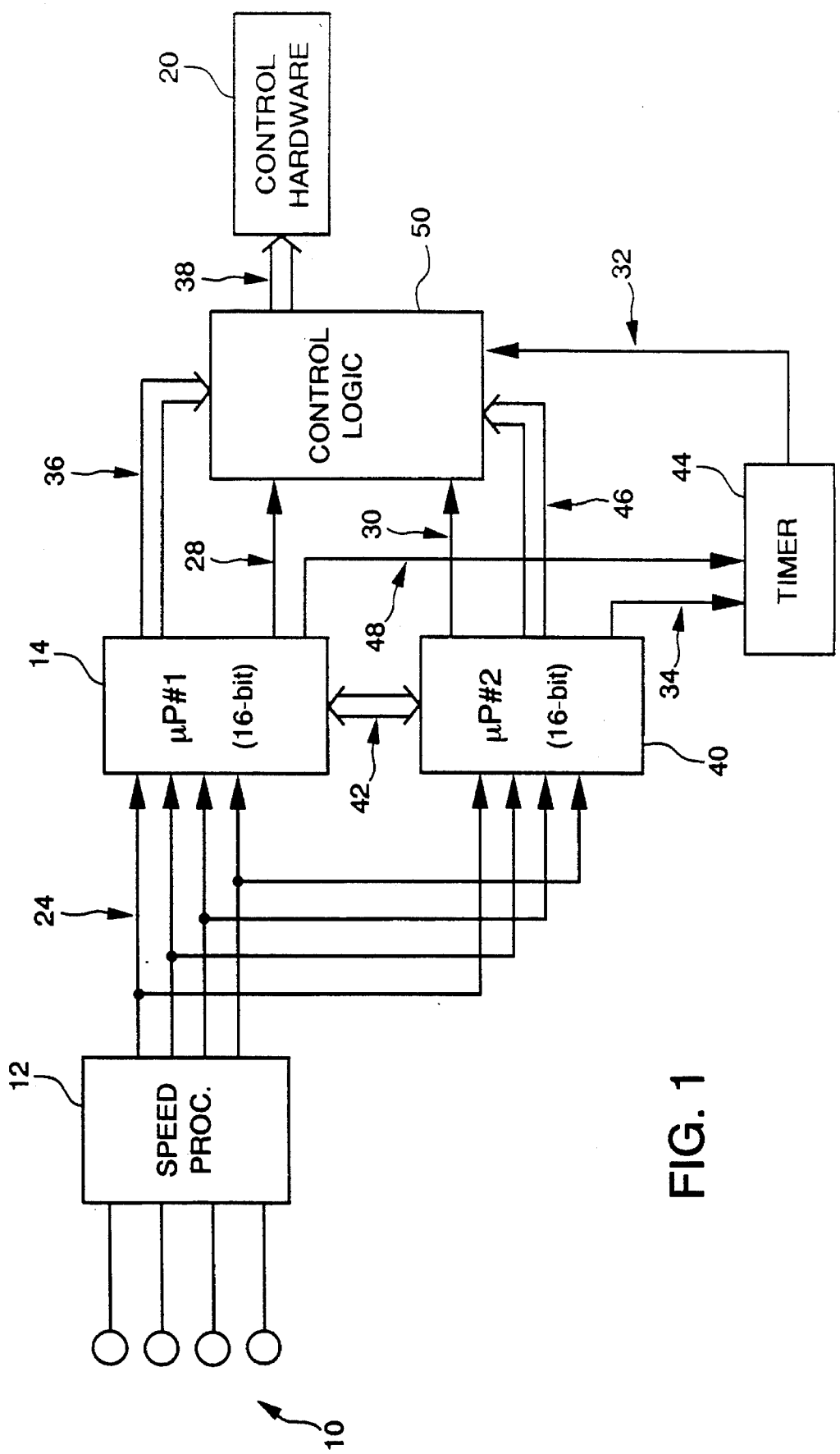
FIG. 1 is a block diagram of the hardware of an ABS control unit of the present invention.

Referring now to the drawing figures, there is illustrated in FIG. 1, an ABS control unit of an anti-lock brake system for carrying out the method and system of the present invention.

In general, ABS diagnostic control algorithms of the present invention are implemented by means of a first microprocessor 14 in conjunction with wheel speed sensors 10, a wheel speed processing circuit 12, control logic 50 and control hardware 20. The wheel speed sensors 10 provide a series of analog pulses whose frequency is proportional to the speed or velocity of the corresponding wheel. The analog output of each of the wheel speed sensors 10 is squared and converted into a corresponding digital pulse train on lines 24 by the speed processor 12. These digital pulse trains are, in turn, fed to the first microprocessor 14.

The first microprocessor 14 is a 16-bit processor which operates based on a five millisecond program loop. During each program loop, the processor 14 calculates a wheel speed for each wheel based on the number of pulse edges received from speed processor 12 and decides whether it is necessary to generate a control signal on lines 36 to change the control of any of the control hardware 20 via control logic 50. These control signals or lines 36 are fed to the control logic 50 which, if the system is functioning normally, passes corresponding control signals on lines 38 to the control hardware 20. If, however, an inhibit signal is present, on any one of the lines 28, 30 or 32, control signals on lines 38 are generated to return control of the brakes to the master cylinder and ABS activity is ended.

The ABS diagnostic algorithms are also implemented by a second microprocessor 40 (also a 16-bit processor) whose purpose is to check the operation of the first microprocessor 14 by providing overall redundant operation. The second microprocessor 40 also operates on a five millisecond program loop and calculates a wheel speed for each wheel and decides whether it is necessary to generate a control signal on lines 46 to change the control of any of the control hardware 20 using the same control algorithm as the first microprocessor 14. Each of the wheel speeds and some of the selected control signals are exchanged between the first and second microprocessors via lines 42.

Each of microprocessors 14 and 40 compares its own wheel speeds with wheel speeds obtained from the other processor. It either microprocessor finds a wheel speed it calculated which differs from the corresponding wheel speed calculated by the other microprocessor, the comparing microprocessor (or each microprocessor if both detect the same difference) adopts the wheel speed which is closest to the corresponding filtered wheel speed from the previous loop. Each microprocessor also selects one wheel speed to check for a fault (the selection of wheel speed generally changes with each cycle, such that after four cycles,, all four wheel speeds have been selected once). If either microprocessor finds that the wheel speed it calculated differs by more than 2 mph from the wheel speed calculated by the other microprocessor, it continues to select that wheel speed in the next loop. If the wheel speeds differ by more than 2 mph in 6 consecutive loops, an ABS inhibit signal is generated on corresponding inhibit line 28 or 30.

Each microprocessor also compares its own control signals with control signals obtained from the other processor. If either microprocessor finds a control signal it calculated differs from the corresponding control signal calculated by the other microprocessor, the comparing microprocessor (or each microprocessor if both detect the same difference) adopts the control signal which generates inaction—as opposed to a signal which generates action. The system is not inhibited based on this condition.

In addition to the checks above, the control logic 50 compares the control signals on lines 36 generated by the first microprocessor to the control signals on lines 46 generated by the second microprocessor 40. If the control logic 50 finds a difference between control signals on lines 36 and 46, the control signals on lines 38 are generated to return control of the brakes to the master cylinder and ABS activity is ended.

In executing their five millisecond program loop, each microprocessor also generates a series of pulses on line 34 or line 48 at a predetermined frequency. If either microprocessor stops executing its program loop for any reason, or if either microprocessor generates pulses at an incorrect frequency due to some malfunction, an ABS inhibit signal is generated on line 32 by a timer 44.

Each microprocessor checks the timing of the program loop of the other processor. If either microprocessor determines that the timing of the other microprocessor is late by more than a fixed amount (such as ½ millisecond), an inhibit signal is generated on corresponding inhibit line 28 or 30. Further, if either microprocessor determines that the timing of the other microprocessor is late by more than sixteen milliseconds in a given loop, the detecting processor microprocessor is reset. This reset will force the other microprocessor to reset as well. Both microprocessors then execute a series of power-up tests and start a new program loop. If both microprocessors have truly stopped execution of their program loops, the timer 44 will generate an inhibit signal as indicated above. If only one microprocessor has stopped execution of its program loop, the other microprocessor will continue to force a reset every 16 milliseconds. If the stopped microprocessor ever recovers, ABS functionality is restored.

Figure 2:
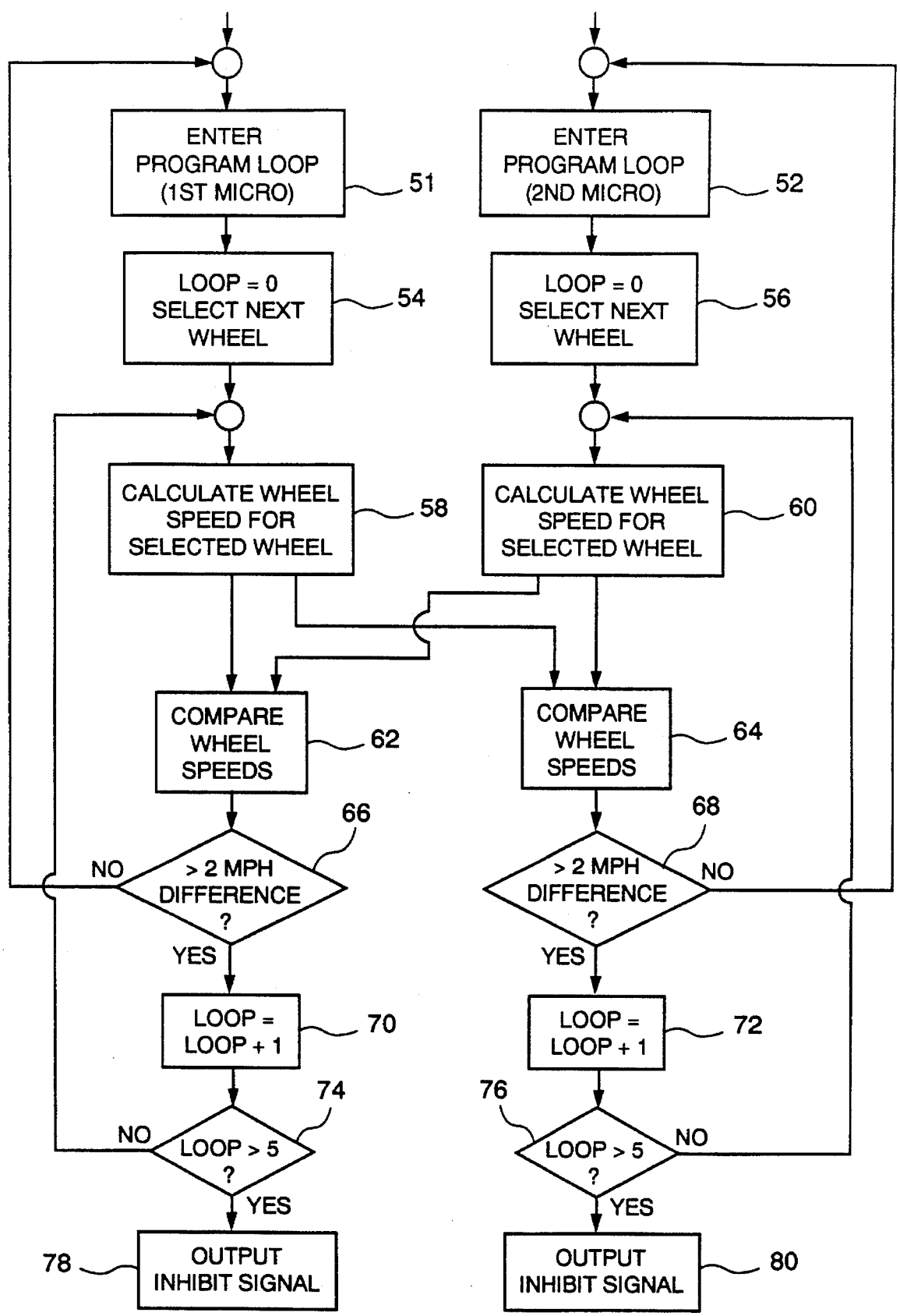
FIG. 2 is a block diagram flow chart of a first diagnostic control algorithm of the present invention.

Referring now to FIG. 2, there is illustrated in block diagram flow chart form, a first diagnostic control algorithm of the present invention. This algorithm determines whether there is a mismatch in the wheel speed calculation performed by the two microprocessors 14 and 40.

Before the algorithm of FIG. 2 is entered, wheel velocity must be above 10 mph. At block 51, the first microprocessor 14 enters its program loop.

At block 52, the second microprocessor 40 enters its program loop.

At block 54, the first microprocessor initializes a variable "loop" to be equal to zero and a particular wheel is selected.

In like fashion, at block 56, the second microprocessor 40 initializes its variable loop to be equal to zero and selects a particular wheel.

At block 58, the first microprocessor calculates wheel speed for the selected wheel. In like fashion, at block 60, the second microprocessor calculates a wheel speed for the selected wheel.

At block 62, the first microprocessor 14 compares the wheel speeds calculate by the first microprocessor 14 and the second microprocessor 40. In like fashion, at block 64, the second microprocessor compares the wheel speeds calculated by the first microprocessor 14 and the second microprocessor 40.

At block 66, the first microprocessor 14 determines whether the difference in the wheel speeds, if any, is greater than a predetermined speed such as 2 mph. In like fashion, the second microprocessor 40 determines whether the wheel speed difference is greater than the same predetermined difference such as 2 mph.

If the difference in wheel speeds is not greater than 2 mph, program control reverts back to block 51 with respect to the first microprocessor 14. In like fashion, program control reverts back to block 52 with respect to the second microprocessor 40.

If the difference in wheel speeds is greater than 2 mph, at block 70, the value of loop is incremented by one with respect to the first microprocessor. In like fashion, at block 72, the value of loop is incremented by one with respect to the second microprocessor 40.

With respect to the first microprocessor, at block 74, if the value of the loop is not greater than a predetermined number such as five, the program control with respect to the first microprocessor, returns to block 58. In like fashion, if the value of the loop is not greater than a predetermined number such as five, the program control reverts to the block 60.

However, with respect to the first microprocessor 14, if the value of the loop is greater than five, then at block 78, the first microprocessor outputs an inhibit signal. In like fashion with respect to the second microprocessor 40, if the value of the loop is greater than five, then at block 80, the second microprocessor 40 outputs an inhibit signal.

As can be seen by the above-noted flow chart of FIG. 2, the criteria of the first diagnostic control algorithm is that computer wheel velocity be above 10 mph and the difference in computed wheel velocity between the two microprocessors 14 and 40 be at least 2 mph.

Finally, the first two criteria must be present for six consecutive checks spaced 5 milliseconds apart.

The algorithm seeks to deal with problems internal to the ABS control for a module that causes the two microprocessors 14 and 40 to calculate two different speed signals for any given wheel for 30 consecutive milliseconds. One potential problem is the degradation of the signal from the speed processor 12 to either one of the microprocessors 14 or 40 or degradation of a central processing unit (CPU) within either of the microprocessors 14 or 40 and/or the timer bases.

Since the calculated velocities should be identical in both microprocessors 14 and 40 because they are based on a single set of wheel speed signals, an individual calculated wheel speed which is different in each microprocessor by at least 2 mph for 30 consecutive milliseconds causes a mismatched wheel speed calculation error to be identified. A typical diagnostic response is to provide an ignition-latched inhibit signal.

Figure 3:
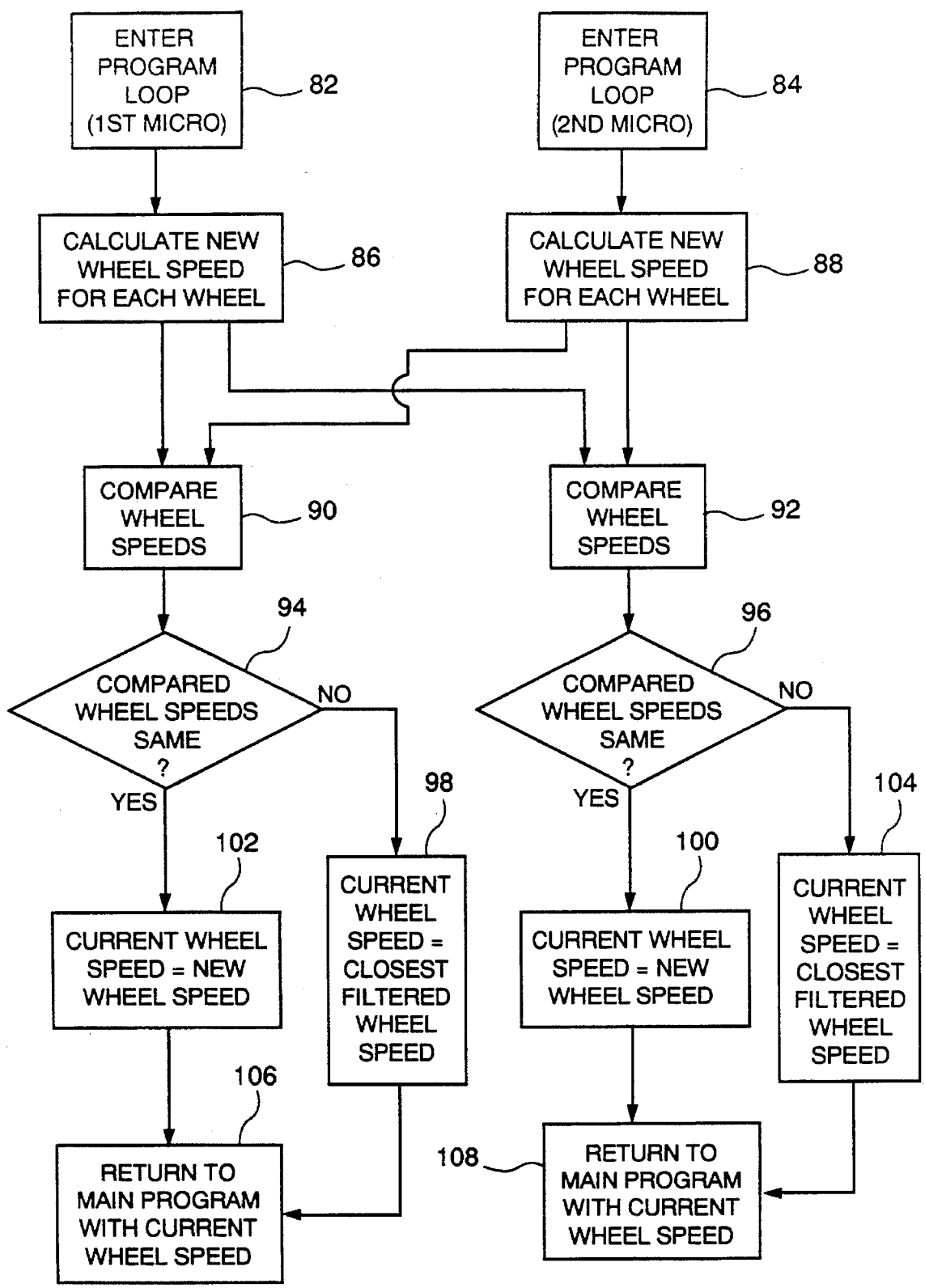
FIG. 3 is a block diagram flow chart of an algorithm for determining current wheel speed for use in the method and system of the present invention.

Referring now to FIG. 3, there is illustrated in flow chart form for each of the microprocessors 14 and 40 how current wheel speed is determined. At block 82, the first microprocessor 14 enters its program loop. In like fashion, at block 84, the second microprocessor 40 enters its program loop.

At block 86, the first microprocessor 14 calculates a new wheel speed for each wheel. In like fashion, at block 88, the second microprocessor 40 calculates wheel speed for each of the wheels.

At block 90, the first microprocessor 14 compares the two calculated wheel speeds. In like fashion, at block 92, the second microprocessor 40 compares the two calculated wheel speeds.

At block 94, the first microprocessor determines whether the wheel speeds are the same. In like fashion, at block 96, the second microprocessor 40 determines whether the compared wheel speeds are the same.

At block 98, the first microprocessor 14 sets the current wheel speed to be equal to the closest filtered wheel speed if the compared wheel speeds are not the same. In like fashion, at block 104, the second microprocessor 40 sets the current wheel speed to be equal to the closest filtered wheel speed if the compared wheel speeds are not the same.

At block 102, the first microprocessor 14 sets the new wheel speed to be equal to the current wheel speed if the compared wheel speeds are the same. In like fashion, at block 100, the second microprocessor 40 sets the current wheel speed to be equal to the new wheel speed if the compared wheel speeds are the same.

At block 106, the first microprocessor returns program control to the main program with the current wheel speed calculated either at block 102 or 98. In like fashion, at block 108, the second microprocessor 40 returns program control to the main program with the current wheel speed calculated either at block 100 or at block 104.

Figure 4A:
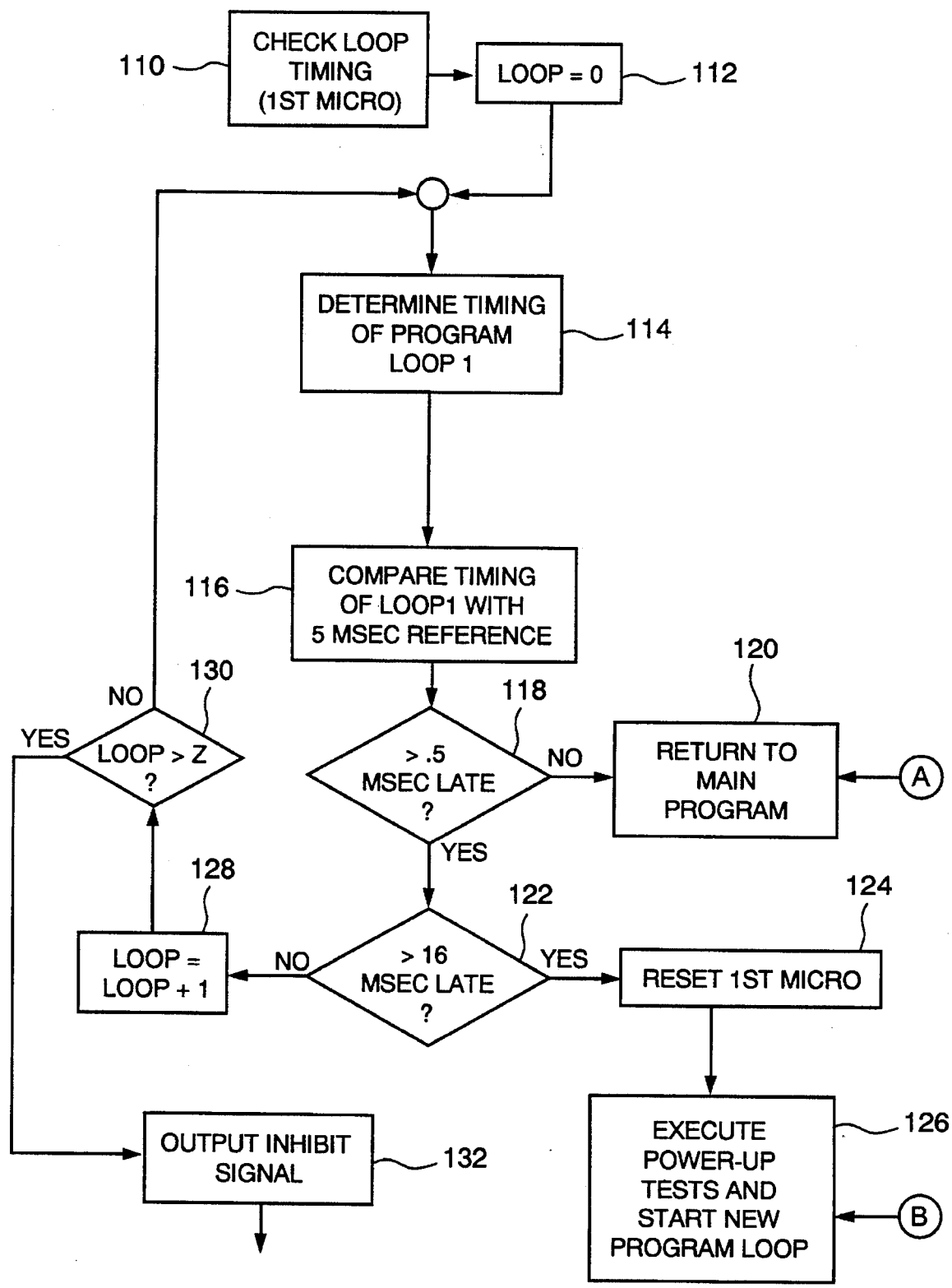
FIGS. 4a and 4b are block diagram flow charts of a second diagnostic control algorithm of the present invention implemented on the first and second microprocessors, respectively, of the control unit.

Referring now to FIG. 4a, there is illustrated in block diagram flow chart form, a second diagnostic control algorithm implemented on the first microprocessor 14. In general, each microprocessor in the ABS control unit runs a programmed set of instructions that must be finished in a given time frame. This predetermined time frame is called loop time. If the loop time is exceeded by at least 500 microseconds, the loop time is said to be extended. If the microprocessor requires extended loop times for 4 consecutive program loops, an ignition latched code is set. The proper diagnostic response in this situation is an ignition latched inhibit signal.

Figure 4B:
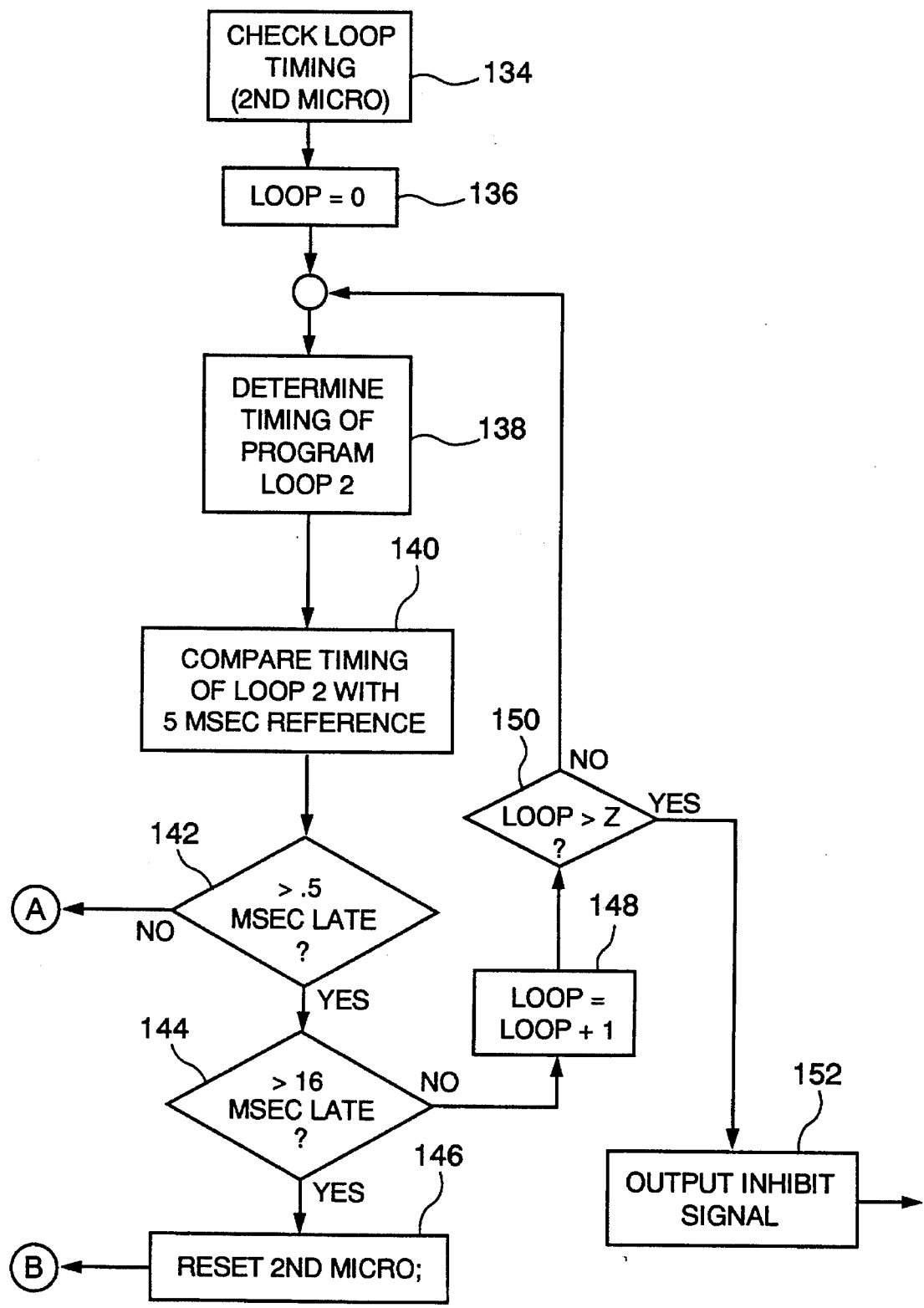

The algorithm described in FIG. 4a as well as the algorithm described in FIG. 4b seek to compensate for problems internal to the ABS control unit that causes a microprocessor to go beyond its predetermined loop time for 4 consecutive loops. This problem may be caused by degradation of the clock of the particular microprocessor or degradation of the central processing unit of the microprocessor.

At block 110 of FIG. 4a, the check loop timing of the first microprocessor 14 is entered.

At block 112, the variable "loop" is initialized to be zero.

At block 114, the first microprocessor determines the timing of the program loop #1.

At block 116, the first microprocessor 14 compares the timing of the first loop with a 5 millisecond reference.

At block 118, the first microprocessor 14 determines whether the timing of the first loop is greater than ½ milliseconds late.

If the timing is not greater than ½ millisecond late, the first microprocessor 14 returns the timing to the main program at block 120.

However, if the timing is greater than ½ millisecond late, the first microprocessor 14 determines whether the timing is greater than 16 milliseconds late at block 122.

At block 124, if the timing is greater than 16 milliseconds late, the first microprocessor 14 resets itself, and the second microprocessor 40.

At block 126, the first microprocessor 14 and the second microprocessor 40 execute power-up steps and start new program loops.

If, however, the first microprocessor 14 determines that the timing of loop #1 is not greater than 16 milliseconds late, as determined at block 122, at block 128, the variable loop is incremented.

At block 130, the first microprocessor 14 determines whether the loop is greater than a variable Z which is preferably 4 in value.

If the variable loop is not greater than 4 in value, program control reverts back to block 114.

If the value of the variable loop is greater than 4 as determined at block 130, block 132 is entered wherein the first microprocessor 14 outputs an inhibit signal.

In like fashion, with reference to FIG. 4b, the second microprocessor checks loop timing at block 134.

At block 136, the variable loop of the second microprocessor 40 is initialized to zero.

At block 138, the second microprocessor 40 determines the timing of its own program loop.

At block 140, the second microprocessor 40 compares the timing of its program loop with a 5 millisecond reference.

At block 142, the second microprocessor 40 determines the timing of its program loop is greater than ½ milliseconds late.

If the timing is not more than ½ millisecond late, program control reverts to block 120 wherein return is accomplished to the main program.

If the timing of the second loop is greater than ½ millisecond late, at block 144, the timing of the second loop is compared to see if it is greater than 16 milliseconds late.

If the timing is greater than 16 milliseconds late, at block 146, the second microprocessor 40 is reset as indicated at block 46 and block 126 is entered wherein the power-up tests and a new program loop is started. This causes the first microprocessor 14 to reset and execute power-up tests and a new program loop.

If the timing of the second program loop is not greater than 16 milliseconds late, then the variable loop is incremented at block 148.

At block 150, the second microprocessor tests to see whether the variable loop is greater than variable Z which is preferably 4.

If the variable loop is not greater than 4, then program control is returned to block 138.

If the variable loop is greater than 4, then the second microprocessor 40 outputs an inhibit signal as indicated at block 152.

Referring again to FIG. 1, the timer circuit 44 is external to both the microprocessors 14 and 40 and guarantees a return to conventional braking if either of the microprocessors 14 or 40 stop functioning. During normal operation, the control program within each of the microprocessors toggles an output thereof, thereby sending a square wave to the timer circuit 44. If these pulses stop, timer circuit 44 cuts off a signal to a power relay (not shown) which inhibits operation of all solenoid valves and the pump motor.

In this way, the absence of pulses from either one of the microprocessors 14 or 40 causes a condition latched inhibit condition.

Typical causes of such a condition are anything that prevents the pulses from the microprocessors 14 or 40 from reaching the timer circuit 44. For example, either or both of the microprocessors 14 or 40 may malfunction. Other types of malfunctions may be within a clock oscillator circuit, loss of power to either one or both the microprocessors, an open circuit or a short ground in the path between either of the microprocessors 14 or 40 and the timer circuit 44.

While the best mode for carrying out the invention has been described in detail, those familiar with the art to which this invention relates will recognize various alternative designs and embodiments for practicing the invention as defined by the following claims.

What is claimed is:

1. In a vehicle anti-lock brake system (ABS), a method for detecting the improper functioning of an ABS control unit having first and second microprocessors, the first microprocessor being programmed with a first program to operate on a first program loop and the second microprocessor being programmed with a second program to operate on a second program loop, the method comprising the steps of:

a) generating a wheel speed signal based on a variable angular speed of a wheel of the vehicle;

b) processing the wheel speed signal to obtain a digital representation for the wheel speed signal;

c) utilizing the first programmed microprocessor to calculate a first wheel speed during the first program loop based on the digital representation for the wheel;

d) utilizing the second programmed microprocessor to calculate a second wheel speed during the second program loop also based on the digital representation for the wheel;

e) utilizing each of the first and second programmed microprocessors to subtract the first and second wheels speeds to obtain first and second difference values, respectively, and to compare the first and second difference values with a first predetermined value, respectively;

f) repeating steps a)–e) as long as both the first difference value is greater than the first predetermined value for a first time defined by a first predetermined number of consecutive program loops of the first programmed microprocessor and the second difference value is greater than the first predetermined value for a second time defined by the first predetermined number of consecutive program loops of the second programmed microprocessor;

g) allowing the variable angular speed of the wheel of the vehicle to vary during the first and second times so that the first wheel speed has a different value during the step of repeating and the second wheel speed has a different value during the step of repeating;

h) utilizing the first and second programmed microprocessors to generate first and second output inhibit signals, respectively, based on repeating steps a)–e) for the first and second times, respectively, thereby indicating improper functioning of the ABS control unit wherein the first and second output inhibit signals are utilized to disable the ABS;

i) utilizing one of the programmed microprocessors to compare timing of the first program loop with a first reference time to obtain a first delay value and to compare the first delay value with a first predetermined time value;

j) repeating step i) for a time defined by a second predetermined number of consecutive program loops as long as the first delay value is greater than the first predetermined time value; and k) utilizing the one of the programmed microprocessors to generate a third output inhibit signal based on repeating step i) for the time defined by the second predetermined number of consecutive program loops, thereby indicating improper functioning of the ABS control unit, wherein the third output inhibit signal is utilized to disable the ABS.

2. The method as claimed in claim 1 wherein the first and second microprocessors have the same number of bits.

3. The method as claimed in claim 2 wherein the first and second program loops are of equal duration.

4. The method as claimed in claim 1 further comprising the step of resetting both of the programmed microprocessors if the first delay value is greater than a second predetermined time value which is greater than the first predetermined time value during any of the consecutive program loops wherein a new program loop is started for both microprocessors.

5. The method as claimed in claim 4 further comprising the steps of:

l) utilizing the other one of the programmed microprocessors to compare timing of the second program loop with a second reference time to obtain a second delay value and to compare the second delay value with a third predetermined time value;

m) repeating step l) for a time defined by a third predetermined number of consecutive program loops as long as the second delay value is greater than the third predetermined time value; and n) utilizing the other one of the programmed microprocessors to generate a fourth output inhibit signal on repeating step l) for the time defined by the third predetermined number of consecutive program loops wherein the fourth output inhibit signal is utilized to disable the ABS.

6. The method as claimed in claim 5 further comprising the step of resetting both programmed microprocessors if the second delay value is greater than a fourth predetermined time value which is greater than the third predetermined time value during any of the consecutive program loops wherein a new program loop is started for both microprocessors.

7. The method of claim 1 wherein the first and second programs are identical ABS control programs.

8. The method of claim 7 wherein the first and second reference times are identical, the first and third predetermined time values are identical, and the second and fourth predetermined time values are identical.

9. In a vehicle anti-lock brake system (ABS), apparatus for detecting the improper functioning of an ABS control unit, the apparatus comprising:

means for generating a wheel speed signal based on a variable angular speed of a wheel of the vehicle;

means for processing the wheel speed signal to obtain a digital representation for the wheel speed signal;

a first microprocessor programmed with a first program to operate on a first program loop to calculate a first wheel speed during the first program loop based on the digital representation for the wheel;

a second microprocessor programmed with a second program to operate on a second program loop to calculate a second wheel speed during the second program loop also based on the digital representation for the wheel, wherein each of the first and second programmed microprocessors is programmed to subtract the first and second wheels speeds to obtain first and second difference values, respectively, and to compare the first and second difference values with a first predetermined value, respectively, and wherein if both the first difference value is greater than the first predetermined value for a first time defined by a first predetermined number of consecutive program loops of the first programmed microprocessor and the second difference value is greater than the first predetermined value for a second time defined by the first predetermined number of consecutive program loops of the second programmed microprocessor, wherein the first microprocessor calculates different values for the first wheel speed during the first time and the second microprocessor calculates different values for the second wheel speed during the second time and wherein the first and second programmed microprocessors generate first and second output inhibit signals, respectively, thereby indicating improper functioning of the ABS control unit wherein the first and second output inhibit signals are utilized to disable the ABS; and wherein one of the microprocessors is further programmed to compare timing of the first program loop with a first reference time to obtain a first delay value and to compare the first delay value with a first predetermined time value for a time defined by a second predetermined number of consecutive program loops as long as the first delay value is greater than the first predetermined time value and wherein the one microprocessor is programmed to generate a third output inhibit signal when the first delay value is greater than the first predetermined time value for the time defined by the second predetermined number of consecutive program loops thereby indicating improper functioning of the ABS control unit wherein the third output inhibit signal is utilized to disable the ABS.

10. The apparatus as claimed in claim 9 wherein the first and second microprocessors have the same number of bits.

11. The apparatus as claimed in claim 10 wherein the first and second program loops are of equal duration.

12. The apparatus as claimed in claim 9 further comprising means for resetting both programmed microprocessors if the first delay value is greater than a second predetermined time value which is greater than the first predetermined time value during any of the consecutive program loops wherein a new program loop is started for both microprocessors.

13. The apparatus as claimed in claim 12 wherein the other microprocessor is programmed to compare timing of the second program loop with a second reference time to obtain a second delay value and to compare the second delay value with a third predetermined time value for a time defined by a third predetermined number of consecutive program loops as long as the second delay value is greater than the third predetermined time value and wherein the other microprocessor is programmed to generate a fourth output inhibit signal when the second delay value is greater than the third predetermined time value for the time defined by the third predetermined number of consecutive program loops wherein the fourth output inhibit signal is utilized to disable the ABS.

14. The apparatus as claimed in claim 13 further comprising means for resetting both programmed microprocessors if the second delay value is grater than a fourth predetermined time value which is greater than the third predetermined time value during any of the consecutive program loops wherein a new program loop is started for both microprocessors.

15. The apparatus of claim 9 wherein the first and second programs are identical ABS control programs.

16. The apparatus of claim 14 wherein the first and second reference times are identical, the first and third predetermined time values are identical, and the second and fourth predetermined time values are identical.

* * * * *